No. 707,398. Patented Aug. 19, 1902.
A. T. DAWSON & G. T. BUCKHAM.
GUN CARRIAGE.
(Application filed Feb. 11, 1902.)
(No Model.) 4 Sheets—Sheet 1.
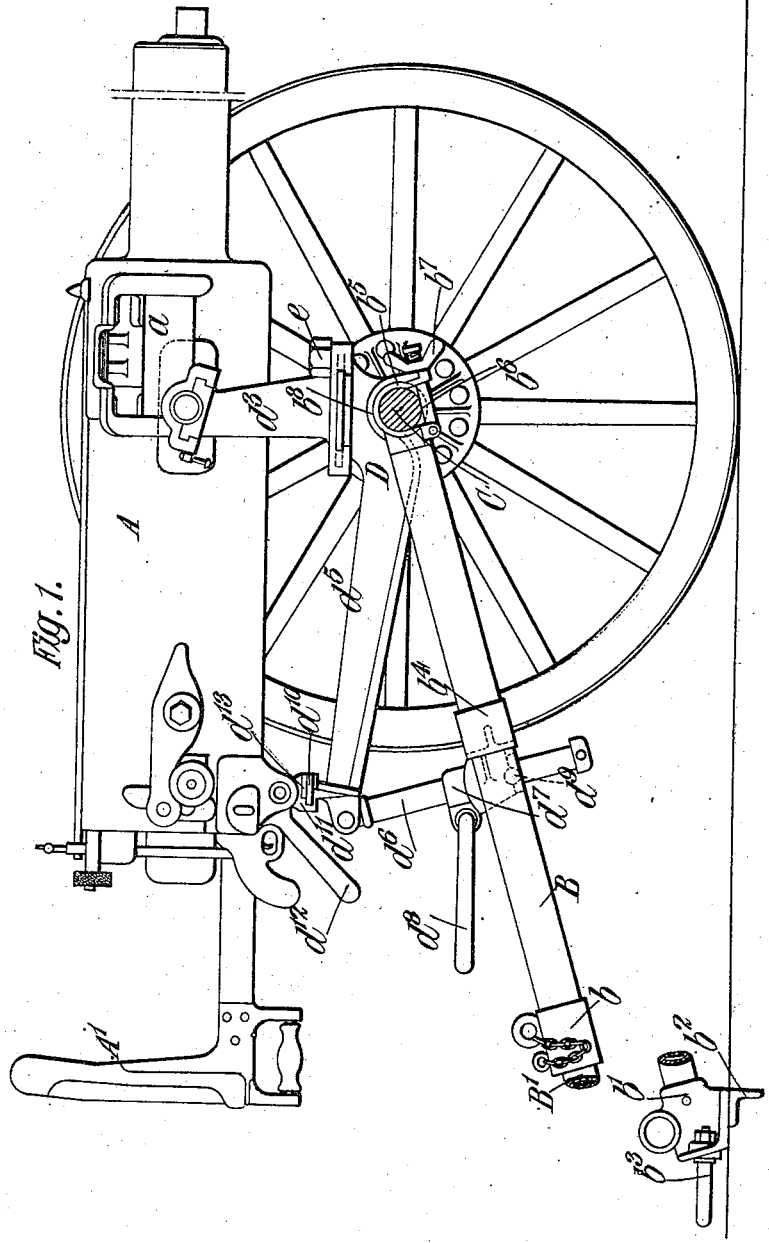
Witnesses:
N. L. Bogan
C. D. Kesler
Inventors
Arthur T. Dawson
George T. Buckham
By James L. Norris
Atty.

No. 707,398. Patented Aug. 19, 1902.
A. T. DAWSON & G. T. BUCKHAM.
GUN CARRIAGE.
(Application filed Feb. 11, 1902.)
(No Model.) 4 Sheets—Sheet 2.
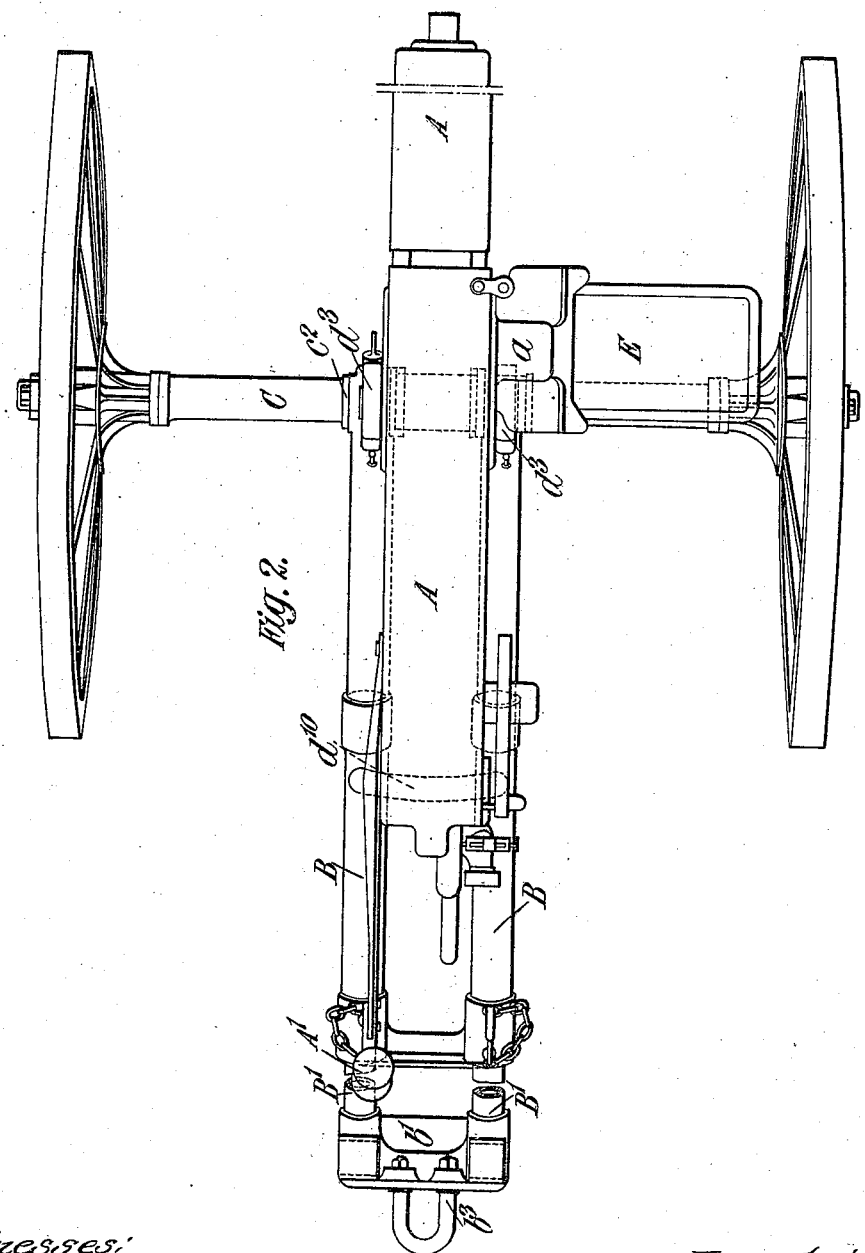

No. 707,398. Patented Aug. 19, 1902.
A. T. DAWSON & G. T. BUCKHAM.
GUN CARRIAGE.
(Application filed Feb. 11, 1902.)
(No Model.) 4 Sheets—Sheet 3.
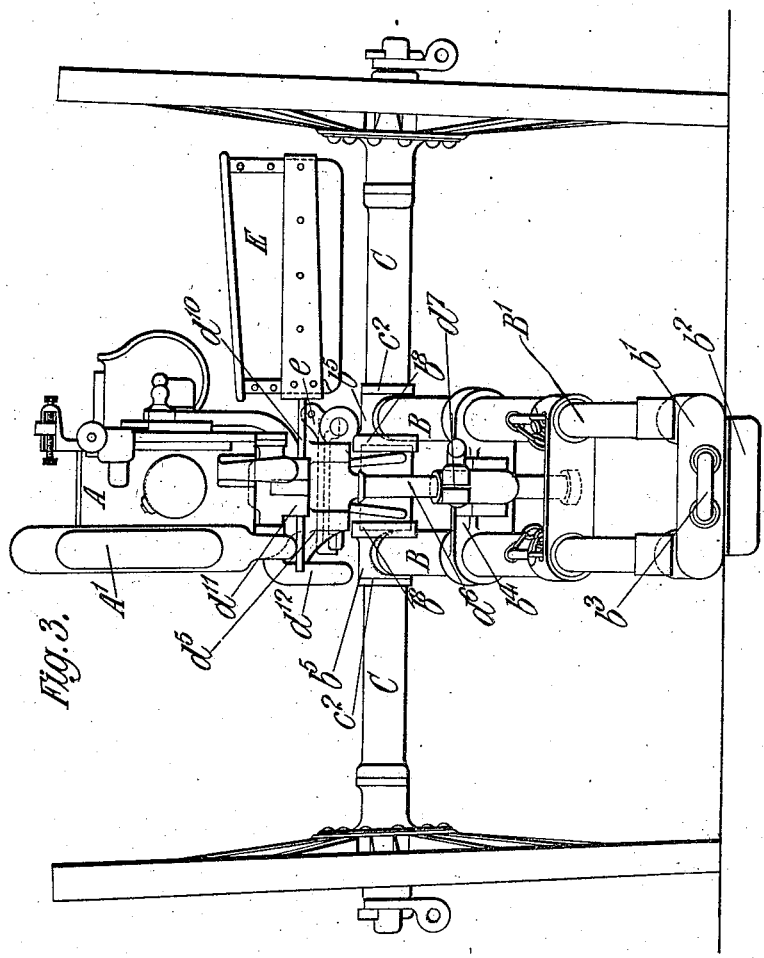

No. 707,398. Patented Aug. 19, 1902.
A. T. DAWSON & G. T. BUCKHAM.
GUN CARRIAGE.
(Application filed Feb. 11, 1902.)
(No Model.) 4 Sheets—Sheet 4.
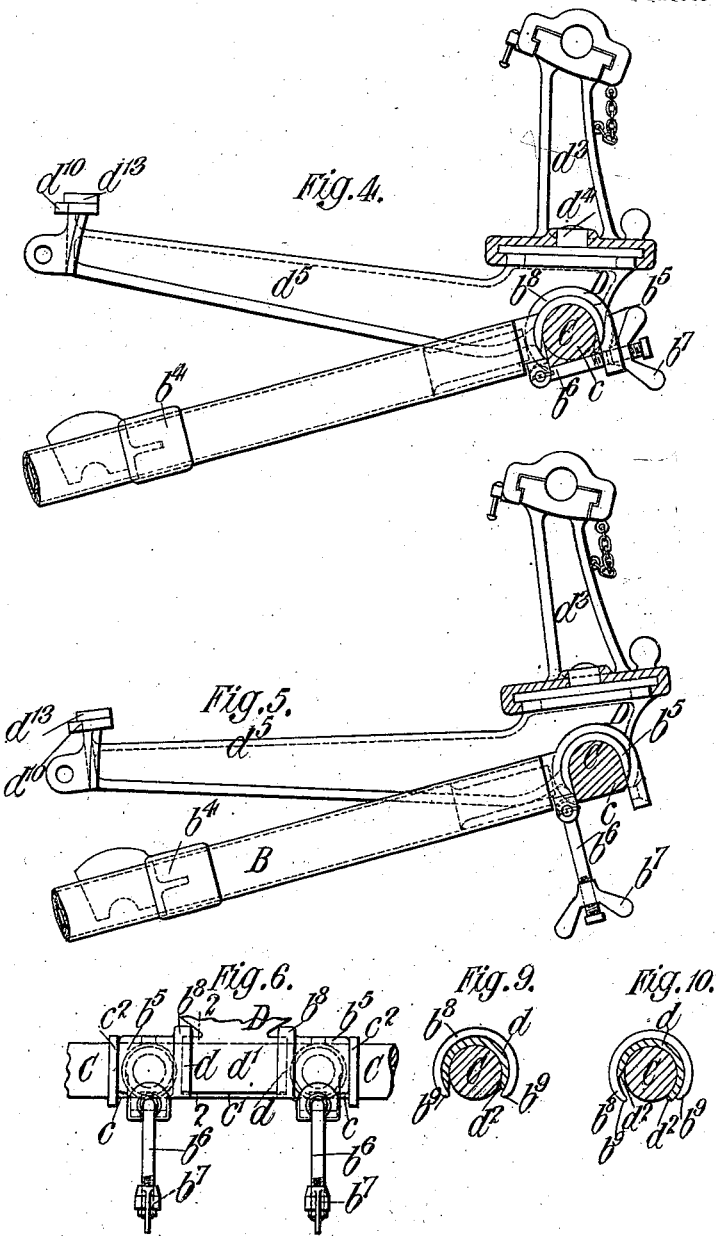
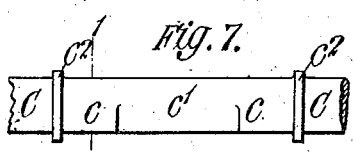
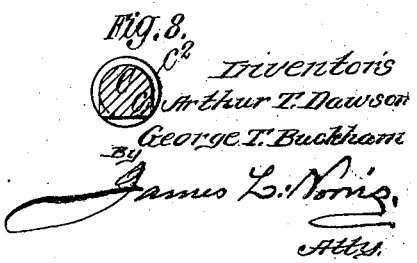

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM, LIMITED, OF WESTMINSTER, LONDON, ENGLAND.

GUN-CARRIAGE.

SPECIFICATION forming part of Letters Patent No. 707,398, dated August 19, 1902.

Application filed February 11, 1902. Serial No. 93,595. (No model.)

*To all whom it may concern:*

Be it known that we, ARTHUR TREVOR DAWSON, late lieutenant of Royal Navy, and GEORGE THOMAS BUCKHAM, engineer, residing at 32 Victoria street, London, England, subjects of the King of Great Britain, have invented certain new and useful Improvements in Gun Carriages or Mountings, of which the following is a specification.

This invention relates to gun carriages or mountings, and is more particularly, although not exclusively, applicable to light mountings for guns of the class commonly termed "pom-poms" and other quick firers, the chief object of our invention being to construct a compact carriage which can be easily taken to pieces when desired.

According to our invention the mounting is in the form of a two-wheeled carriage, of which the trail is composed of two parallel telescopic tubes suitably braced and strengthened by transverse pieces. The ends of these tubes where they are coupled to the carriage-axle are formed with U-shaped or similar brackets adapted to fit upon D-shaped or similar lugs on the axle and to be secured in place by suitable means, such as nuts or screws. The said trail-brackets are provided with lateral recesses, forming bearings concentric with the axle. The pivot-plate is formed with a U-shaped or similar bracket to fit upon the axle between said D-shaped lugs. The ends of the said U-shaped bracket enter the aforesaid lateral recesses in the trail-brackets and coöperate therewith in such manner that said top carriage can only be removed from the wheel-axle, together with the trail-brackets, when the top carriage is in its fully-elevated position. The pivot-plate of the top carriage has a rearward extension or arm, which is connected at its free extremity with the elevating-gear. Said arm has a racer or segment, upon which a clamping-bracket on the gun is capable of sliding in the training movement of the gun and of being locked in the required position. An ammunition-tray is suitably connected with the top carriage and participates in all the movements of the gun.

In order that our said invention may be clearly understood and readily carried into effect, we will describe the same more fully, with reference to the accompanying drawings, in which—

Figure 1 is a side elevation of the mounting with one of the carriage-wheels removed. Fig. 2 is a plan, and Fig. 3 a rear elevation, of the said mounting. Figs. 4 and 5 are vertical sections, and Fig. 6 is a front elevation, of the carriage-axle, showing more clearly the attachment of the trail and top carriage to said axle. Fig. 4 represents the top carriage in its horizontal position, and Fig. 5 said top carriage in its extreme angle of elevation. Fig. 7 is a front elevation of the carriage-axle with the trail and top carriage removed therefrom. Fig. 8 is a cross-section on the line 1 1 of Fig. 7. Fig. 9 is a cross-section on the line 2 2 of Fig. 6, and Fig. 10 is a similar cross-section showing the U-shaped bracket of the top carriage in a different angular position to that represented in Fig. 9.

A is the gun. B B' are the parallel tubes composing the trail. C is the carriage-axle, and D the pivot-plate of the top carriage. The said tubes B are connected together at their ends by a cross-piece $b$ and are of larger diameter than the tubes B', so that the latter are capable of longitudinal adjustment therein to enable the trail to be contracted and carried on a pack-saddle when removed from the axle C. The ends of the smaller tubes B' are united by a cross-piece or trail-shoe $b'$, which is provided with a spade $b^2$ and an eye $b^3$ for "limbering up."

$b^4$ is another cross-piece situated about half-way of the length of the tubes B and serving as a support for the elevating-gear.

$b^5 b^5$ are the U-shaped trail-brackets, which are socketed into the forward ends of the tubes B and which are adapted to fit over the D-shaped lugs $c$ of the axle. These trail-brackets are provided with hinged screw-bolts $b^6$, which can be turned into a position transverse of the axle, in which position they can be maintained by butterfly-nuts $b^7$ to unite the trail to the axle. The said trail-brackets are formed with the lateral recesses $b^8$ for the reception of the ends $d$ of the U- shaped bracket $d'$ of the pivot-plate D. (See Figs. 6, 9, and 10.) These recesses are concentric with the axle C and are approximately semicircular in shape. The U-shaped bracket of the pivot-plate fits upon the cylindrical portion $c'$ of the axle between the aforesaid D-shaped lugs $c$ and is capable of angular movement thereon and in the recesses or bearings $b^5$ of the trail-brackets $b^5$ in order to vary the angle of elevation of the gun.

$c^2$ $c^2$ are collars on the axle C, which when the pivot-plate and trail-brackets are in place prevent lateral movement of the parts on the axle.

When the pivot-plate is turned into the position represented by Figs. 5 and 9, the horns or extremities $d^2$ $d^2$ of the U-shaped bracket of the pivot-plate coincide with the horns or extremities $b^9$ $b^9$ of the U-shaped trail-brackets $b^5$, Fig. 9, so that when the hinge-bolts are turned into their open position, Fig. 6, both the trail-brackets $b^5$ and the pivot-plate bracket $d'$ can be lifted and removed from the axle. When, however, the extremities $d^2$ of the pivot-plate bracket occupy any other angular position relatively to the extremities $b^9$ of the trail-brackets—as, for instance, that represented in Fig. 10—the gap between the extremities $d^2$ $b^9$ is less than the diameter of the cylindrical portion of the axle C, and consequently the said U-shaped brackets cannot be lifted from the axle. It is only by bringing the pivot-plate into the position of extreme elevation represented by Fig. 5 that the said extremities $d^2$ $b^9$ can be caused to coincide with one another, Fig. 9, and therefore it is only in this position of the parts that the trail and top carriage can be detached from the axle. The gun can therefore be elevated or depressed through all the ordinary angles without any liability of the parts becoming unintentionally detached. The gun is trunnioned in the cross-head $d^3$, which is capable of lateral angular movement about the pivot $d^4$ of the pivot-plate, Figs. 4 and 5.

$d^5$ is the rearward extension or arm of the pivot-plate, and $d^6$ is the rod of the elevating-gear, to which it is hinged at its rear end. This elevating-rod extends through a split socket $d^7$ on the cross-piece $b^4$ of the trail and can be adjusted longitudinally therein in any desired position and locked by a clamp-handle $d^8$. The said split socket is furnished with trunnions $d^9$, Fig. 1, about the axis of which the socket and elevating-rod can turn during the elevation or depression of the gun.

$d^{10}$ is the racer or segment at the rear end of the arm $d^5$, and $d^{11}$ is the clamping-bracket carried by the gun and adapted to slide on said racer when the gun is laterally traversed by the gunner through the intervention of the crutch or shoulder-piece $A'$.

$d^{12}$ is the handle for locking said clamping-bracket in any required position on the said racer.

$d^{13}$ $d^{13}$ are stops at the extremities of the racer for limiting the extent of lateral movement of the gun thereon.

Situated on the right-hand side of the cross-head $d^3$, near the base of the same, is a lug $e$, which supports the ammunition-tray E in a position beneath and in line with the feed-block $a$ of the gun. The said ammunition-tray E by being mounted on the cross-head participates in all the movements of the gun in its vertical and lateral adjustments, and therefore always keeps the feed-belt in proper position relatively to the feed-block.

What we claim, and desire to secure by Letters Patent of the United States, is—

1. In a gun-carriage, the combination with the wheel-axle, the trail and the top carriage, of U-shaped brackets on the trail, D-shaped lugs on the axle, means for locking the trail-brackets and lugs together, and a U-shaped bracket on the pivot-plate adapted to rotatably engage with a cylindrical portion of the axle and with bearings in the trail-brackets, for the purpose specified.

2. In a gun-carriage, the combination with the wheel-axle, the trail and the top carriage, of U-shaped brackets on the trail, D-shaped lugs on the axle, hinge-bolts and nuts on the trail-brackets for locking the trail to the axle, and a U-shaped bracket on the pivot-plate rotatably engaging with a cylindrical portion of the axle between the D-shaped lugs thereon, and with concentric lateral and gapped recesses in the trail-brackets said recesses being so disposed relatively to the axle that the trail-brackets and pivot-plate bracket coöperate to lock the trail and the pivot-plate to the axle substantially as described.

3. In a gun-carriage, the combination with the wheel-axle and the top carriage, of a trail composed of two parallel telescopic metal tubes, of cross-pieces connecting together said parallel tubes, U-shaped brackets on said tubes to engage with D-shaped lugs on the axle, means for detachably locking said brackets to said lugs, collars on said axle for preventing lateral movement of the trail on the axle, and a U-shaped bracket on the pivot-plate of the top carriage, engaging with a cylindrical part of the axle and with semicircular or gapped lateral recesses in the trail-brackets substantially as and for the purpose specified.

In testimony whereof we have hereunto set our hands, in presence of two subscribing witnesses, this 30th day of January, 1902.

ARTHUR TREVOR DAWSON.
GEORGE THOMAS BUCKHAM.

Witnesses:
CHRISTOPHER TURNER,
HENRY KING.